(12) United States Patent
Al-Rawi

(10) Patent No.: US 8,218,134 B2
(45) Date of Patent: Jul. 10, 2012

(54) ROTATION AND DIFFERENTIAL ANGLE OPTICAL SENSOR WITH NON-TRANSITION PATTERN SAMPLING

(75) Inventor: Steven Al-Rawi, Irvine, CA (US)

(73) Assignee: BI Technologies Corporation, Fullerton, CA (US)

( * ) Notice: Subject to any disclaimer, the term of this patent is extended or adjusted under 35 U.S.C. 154(b) by 453 days.

(21) Appl. No.: 12/627,978

(22) Filed: Nov. 30, 2009

(65) Prior Publication Data

US 2011/0128529 A1 Jun. 2, 2011

(51) Int. Cl.
*G01C 1/06* (2006.01)
(52) U.S. Cl. ............... 356/139; 356/617; 250/231.18
(58) Field of Classification Search .......... 356/139, 356/138, 141.1–141.3, 614, 616, 617; 250/231.1, 250/231.13, 231.14, 231.18; 33/706–707; 341/11, 13, 31; 73/1.75, 1.79
See application file for complete search history.

(56) References Cited

U.S. PATENT DOCUMENTS

| | | | |
|---|---|---|---|
| 5,537,874 A | 7/1996 | Akahane et al. | |
| 5,573,088 A | 11/1996 | Daniels | |
| 5,841,132 A | 11/1998 | Horton et al. | |
| 5,900,930 A | 5/1999 | Simon et al. | |
| 5,981,941 A * | 11/1999 | Takata et al. | 250/231.16 |
| 6,285,024 B1 | 9/2001 | Pinnock | |
| RE37,969 E | 1/2003 | Horton et al. | |
| 6,563,109 B1 | 5/2003 | Kosters | |
| 6,800,843 B2 * | 10/2004 | Horton | 250/231.13 |
| 6,884,991 B2 | 4/2005 | Durocher | |
| 6,935,193 B2 | 8/2005 | Heisenberg et al. | |
| 7,064,316 B2 | 6/2006 | Steinlechner et al. | |
| 7,145,131 B2 | 12/2006 | Mizuno et al. | |
| 7,199,356 B2 | 4/2007 | Sano | |
| 7,292,325 B2 | 11/2007 | Lee | |
| 7,752,894 B2 * | 7/2010 | Uusivirta et al. | 73/53.03 |
| 2004/0113058 A1 * | 6/2004 | Sonoki | 250/231.14 |
| 2004/0129091 A1 | 7/2004 | Duret et al. | |
| 2005/0103125 A1 | 5/2005 | Desbiolles | |

(Continued)

FOREIGN PATENT DOCUMENTS

WO 9606330 A1 2/1996

(Continued)

OTHER PUBLICATIONS

Notice of Allowance, mailed Aug. 31, 2011, for U.S. Appl. No. 12/628,008, filed Nov. 30, 2009, entitled "Rotation and Differential Angle Optical Sensor With Short Optical Sensing Array."

(Continued)

*Primary Examiner* — Tarifur Chowdhury
*Assistant Examiner* — Michael P Lapage
(74) *Attorney, Agent, or Firm* — McDermott Will & Emery LLP

(57) ABSTRACT

A sensor may simultaneously sense the angular position of a first rotatable member relative to a frame of reference and the angular position of a second rotatable member relative to the first rotatable member. The sensor may include a first and second disk, each having an annular pattern which alternates between two different levels of optical transparency. One disk may be coupled to the first rotatable member, the other disk may be coupled to the second rotatable member. A signal processing system may determine both angular positions based on sampling a consolidation of the first and the second annular patterns at locations that are not at a transition in the consolidated pattern.

20 Claims, 7 Drawing Sheets

U.S. PATENT DOCUMENTS

| | | | |
|---|---|---|---|
| 2006/0279278 A1 | 12/2006 | Desbiolles et al. | |
| 2009/0266178 A1* | 10/2009 | Matzoll et al. | 73/862.326 |
| 2011/0128528 A1 | 6/2011 | Al-Rawi | |
| 2011/0128530 A1 | 6/2011 | Al-Rawi | |
| 2011/0128531 A1 | 6/2011 | Al-Rawi | |

FOREIGN PATENT DOCUMENTS

| | | |
|---|---|---|
| WO | 9939169 A1 | 8/1999 |
| WO | 2011/066066 A1 | 6/2011 |

OTHER PUBLICATIONS

Notice of Allowance, mailed Sep. 22, 2011, for U.S. Appl. No. 12/628,000, filed Nov. 30, 2009, entitled "Rotation and Differential Angle Optical Sensor With Integral Bearing Races," including Examiner's Notice of References Cited.

Notice of Allowance, mailed Sep. 22, 2011, for U.S. Appl. No. 12/628,019, filed Nov. 30, 2009, entitled "Rotation and Differential Angle Optical Sensor Which Does Not Require Keyed Installation," including Examiner's Notice of References Cited.

PCT Application No. PCT/US2010/055140 (corresponds to WO 2011/066066 A2), filed Nov. 2, 2010, entitled "Rotation and Differential Angle Optical Sensors," International Search Report and Written Opinion of the International Searching Authority, dated Jun. 16, 2011.

* cited by examiner

ROTATION AND DIFFERENTIAL ANGLE OPTICAL SENSOR WITH NON-TRANSITION PATTERN SAMPLING

CROSS-REFERENCE TO RELATED APPLICATIONS

This application is related to the following U.S. utility applications filed on the same day by the same inventor: application Ser. No. 12/628,000, entitled "Rotation And Differential Angle Optical Sensor With Integral Bearing Races," application Ser. No. 12/628,008, entitled "Rotation and Differential Angle Optical Sensor with Short Optical Sensing Array," and application Ser. No. 12/628,019, entitled "Rotation And Differential Angle Optical Sensor Which Does Not Require Keyed Installation,". The content of each of these applications is incorporated herein by reference.

BACKGROUND

1. Technical Field

This disclosure relates to optical sensors, including rotational optical sensors configured to measure the rotation of a steering wheel in a vehicle and the torque that is applied to it.

2. Description of Related Art

Sensors may be used to determine rotational position, such as the position of a shaft attached to a steering wheel in a vehicle. The sensors may also determine the torque that is applied to the steering wheel by measuring the angular displacement between two different shafts which are attached to one another through a torsion rod.

Some sensors couple a potentiometer to each rotating shaft to make these angular measurements. However, potentiometers may fail to operate due to surface contamination and/or wear related to sliding contacts.

Magnetic sensors may couple a magnet to each rotating shaft and may use a magnetic field detector to make these angular measurements. However, stray magnetic fields and variations in magnet strength may reduce the precision of the sensors. The components may also be costly.

Optical sensors may couple a disk to each rotating shaft to make to these angular measurements. Each disk may have an annular pattern which alternates between different levels of optical transparency. A light source and associated optical sensing array may be used to detect a portion of the combined pattern from both disks, which may then be translated into the angular positions. However, it may be costly to manufacture and assemble the components, such as the patterns on the disks, to within a sufficient degree of tolerance so as to achieve needed accuracy, such as to achieve an accuracy of ±0.02 degrees. Such sensors may also have to be aligned to a key in the shaft in order to function properly. This may add to the cost of the shaft and to the installation procedure.

SUMMARY

A sensor may simultaneously sense the angular position of a first rotatable member relative to a frame of reference and the angular position of a second rotatable member relative to the first rotatable member. The sensor may include a first disk, a first coupling, a second disk, a second coupling, an optical sensing array, a lighting system, and a signal processing system.

The first disk may have a first annular pattern which alternates between two different levels of optical transparency.

The first coupling may couple the first disk to the first rotatable member.

The second disk may have a second annular pattern which alternates between two different levels of optical transparency and which has substantially the same radius as the first annular pattern. The second disk may be configured such that the first and the second annular patterns may independently rotate about substantially the same axis while remaining substantially adjacent to one another.

The second coupling may couple the second disk to the second rotatable member.

The optical sensing array may provide signals indicative of an illumination pattern which is cast upon the optical sensing array.

The lighting system may direct light toward the first and the second disks with an orientation that causes an illumination pattern to be cast upon the optical sensing array which corresponds to a composite of a portion of the first and the second annular patterns.

The signal processing system may determine locations of transitions between different levels of illumination in the illumination pattern that is cast upon the optical sensing array, determine locations at which to sample the illumination level in the illumination pattern that is cast upon the optical sensing array that are not at a transition, sample the illumination level in the illumination pattern that is cast upon the optical sensing array at each of the sampling locations, and generate an output that is indicative of both of the angular positions based on the illumination pattern sample.

The sensor may include a data storage system containing a look-up table that contains a plurality of unique reference illumination patterns and, for each, a corresponding unique set of both of the angular positions. The signal processing system may determine both of the angular positions by finding a match in the look-up table between the illumination pattern sample and one of the reference illumination patterns in the look-up table.

The reference illumination patterns and the illumination pattern sample may each be binary vectors. All of binary vectors may have the same length. The length may be in excess of ten or twenty bits.

The output may be indicative of both angular positions to the nearest of one of a set of angular reference positions. The signal processing system may determine both of the angular positions more precisely based on the location of a transition in the illumination pattern sample which corresponds to a transition in the first annular pattern and another transition in the illumination pattern sample which corresponds to a transition in the second annular pattern. Each of the transitions may be at a location at which the annular pattern transitions in only one of the disks.

The sensor may include a data storage system which may contain calibration data. The signal processing system may utilize the calibration data when determining the location of at least one of the transitions in the illumination pattern.

The optical sensing array may have a plurality of pixel elements. Each may provide a signal indicative of a level of illumination which is cast upon the pixel element. The calibration data may include data indicative of the level of the signal from each pixel element when a known portion of the pixel element is illuminated. The known portion may be approximately half of the pixel element.

The optical sensing array may have a plurality of pixel elements. The calibration data may include data indicative of the location of each pixel element.

Each of the pixel elements may provide a signal indicative of the level of illumination which is cast upon the pixel element. The calibration data may include data indicative of the rate at which the signal that is provided by each pixel element changes as a function of changes in the level of illumination which is cast upon each pixel element.

The sensor may include a data storage system containing calibration data that includes data indicative of a location error in each of the transitions between the two different levels of optical transparency in each of the annular patterns. The signal processing system may be configured to utilize the calibration data when generating the output.

The illumination pattern sample may contain at least ten transitions.

The sensor may sense the angular position of the second rotatable member relative to the first rotatable member up to a maximum displacement angle. The optical sensing array may have a length which is not substantially greater than the width of the illumination pattern cast upon the optical sensing array. The lighting system may be configured to cause the illumination pattern which is cast upon the optical sensing array to be annular and to span an angle that is less than or equal to the maximum displacement angle.

Each of the disks may be formed by a stamping process.

Each of the disks may have an integral race configured to support ball bearings.

The lighting system may include a light source and a reflecting system configured to focus and collimate light from the light source onto the first and the second disks. The light source and the optical sensor array may be adjacent to the same side of one of the disks. The light source and the optical sensor may be mounted to a common circuit board.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Figure 1:
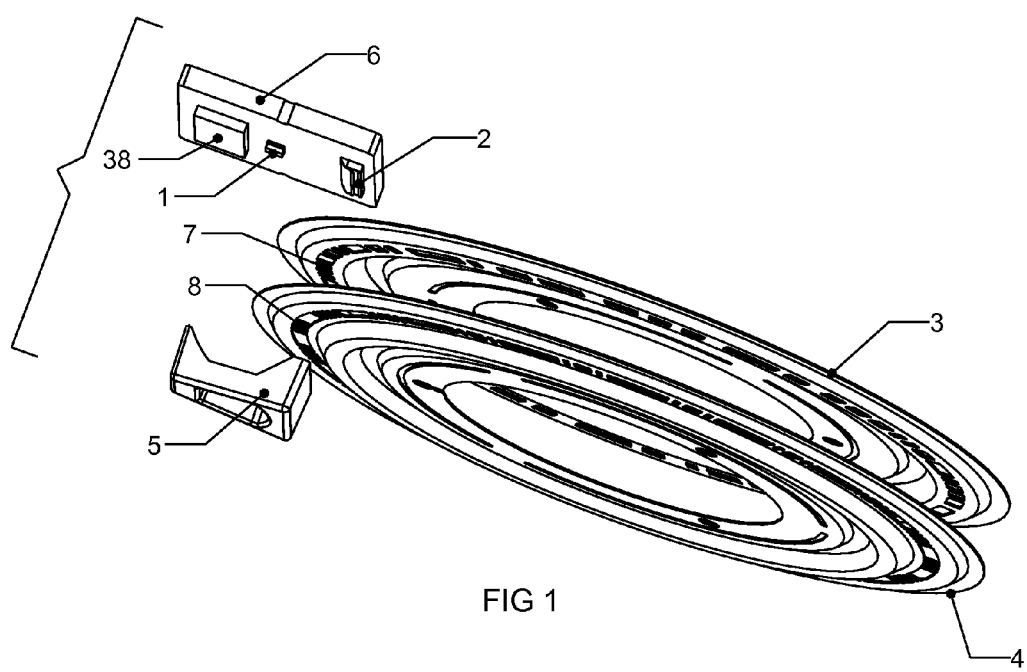
FIG. 1 illustrates components of a rotation and differential angle optical sensor.

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Two patterned disks, a light source, and an optical sensing array may be used. The patterns may lie along circular tracks that alternate between two levels of transparency. One level may be completely opaque; the other level may be completely transparent. The components may be arranged so that an image of a sector of the consolidated patterns in both tracks is projected onto the optical sensing array. The disk patterns may be chosen such that the projection resulting on the optical sensing array is unique for every rotation of the first disk between zero and 360 degrees and for every rotation of the second disk relative to the first disk within a predefined angle. The consolidated projected patterns of the disks may allow the positions of both disks to be computed from the output of a single optical sensing array. A calibration routine may eliminate the need to manufacture or position the components of the sensor with a high degree of precision.

The disks may contain patterns with pattern boundaries nominally occurring at integer multiples of 360/N degrees, where N is a positive integer. The required tolerance on the boundary separations may be plus or minus 360/4(N) degrees. A smaller N may give a larger minimum boundary separation and a larger tolerance on the boundary position. Sensors may use a small N, such as an N that is less than 1200.

The absolute position sensor may resolve the angular position of one disk for any rotation between zero and 360 degrees and the angular position of a second disk relative to the first disk over a range of zero to D degrees. D may be determined by the pattern design and may be limited to 360 degrees. D may be referred to as the maximum differential sensing angle.

The disk patterns may not require fine or precise geometry and may be produced with commercial stamping processes. Large transparent areas in the annular patterns may be used which are less likely to be obstructed by stray particles.

Stamped bearing races may be integrated into the disks. Alternate methods of making the disks may include photo etching and molding.

The sensor may be useful in steering systems. Many vehicles may require steering angle and applied steering torque information. When a sensor of one of the types described herein is installed, a first disk may be coupled to the steering shaft and a second disk may be coupled to a hand wheel shaft. The hand wheel shaft may be connected to the steering shaft by a torsion rod. Steering angle, measured with respect to the vehicle frame, may be output by determining the rotation of the first disk. Rotating the hand wheel shaft may apply torque to the steering shaft by twisting the torsion rod. The angular twist of the torsion rod may be the differential angular rotation between the first and second disks. The applied torque may be calculated from the differential angle (the twist of the torsion rod) by using Hooke's law and the stiffness (spring rate) of the torsion rod. The angular position of the first disk relative to the second disk may be accurately determined up to a maximum differential sensing angle which may equal or exceed the angular span of the optical sensing array.

Figure 3:
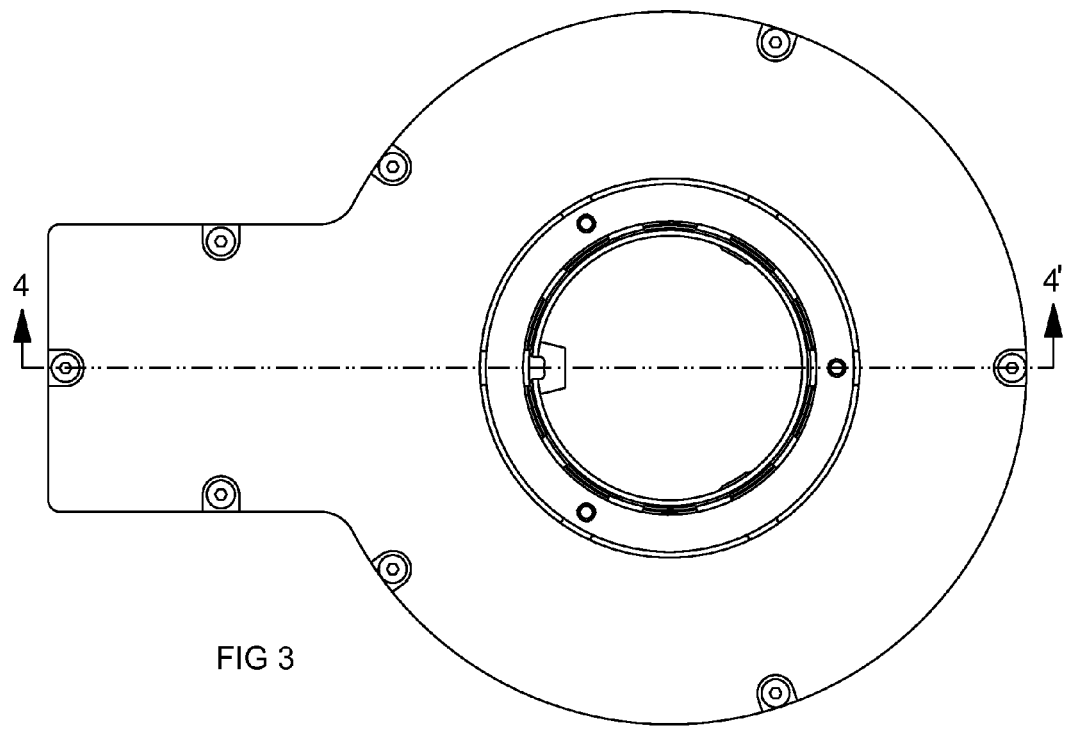
FIG. 3 is a top view of a rotation and differential angle optical sensor that may contain the components illustrated in FIG. 1.
Figure 4:
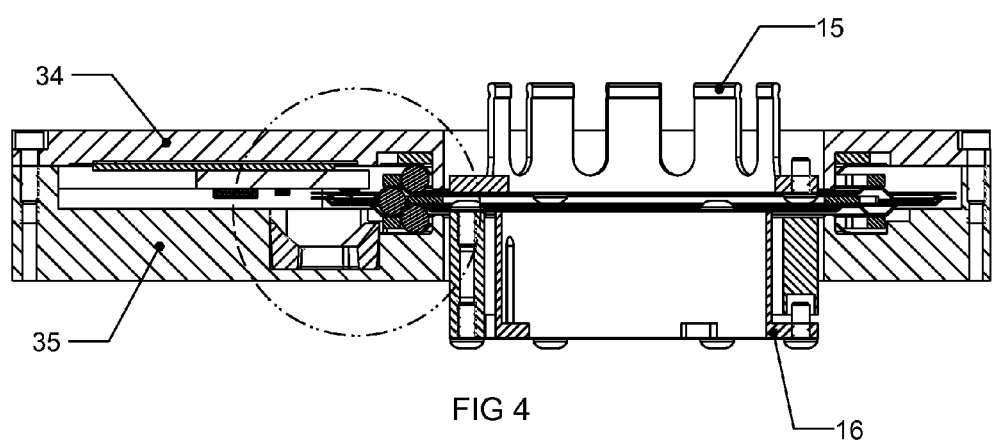
FIG. 4 is a sectional view of FIG. 3 along the line 4-4'.

FIG. 1 illustrates components of a rotation and differential angle optical sensor. The sensor (shown in a top view in FIG. 3 and a cross section view in FIG. 4) may include two patterned disks, such as a first disk 3 and a second disk 4, a light source 1, a signal processing system and associated data storage system 38, and an optical sensing array 2.

The optical sensing array 2 may include a number of sensing pixel elements, such as 128 or any other number of sensing pixel elements. The light source 1, the signal processing system and associated data storage system 38, and the optical sensing array 2 may be mounted on a printed circuit board 6 that may be held in a needed position by a pad 19.

Annular patterns 7 and 8 may alternate between two different levels of optical transparency and may be on the disks 3 and 4, respectively. The patterns may lie along a circular track of nearly equal diameter on each disk. The patterns may be relatively coarse, may not require high precision, and may be produced by a commercial stamping process.

The disks 3 and 4 may be held so they rotate about a common axis without being able to translate relative to the optical sensing array 2. The axis of disk rotation may pass through the center of each circular track and may be normal to the patterned surfaces and optical sensing array surface.

Figure 5:
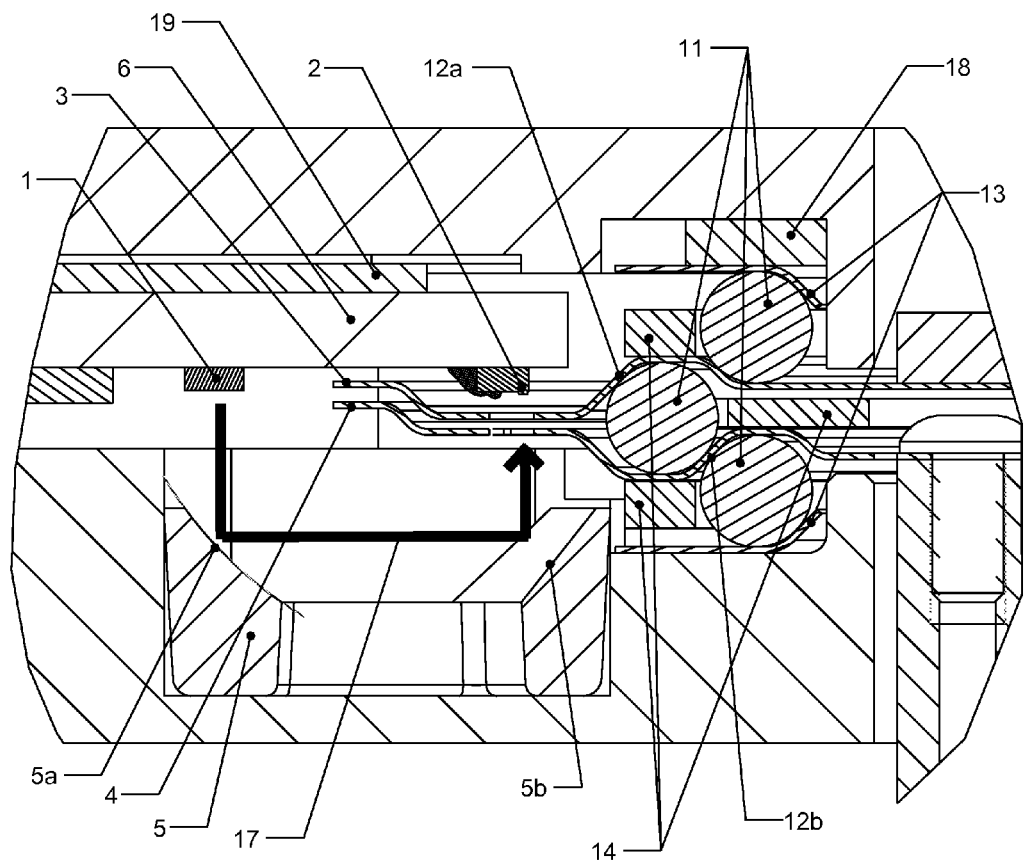
FIG. 5 is an enlarged view of the circled portion of the sectional view shown in FIG. 4.

As shown in the detail view in FIG. 5, mirrors 5a and 5b may direct light along a path 17 from the light source 1 and through a portion of the patterns on the disks 3 and 4 so that a consolidated projection of the two patterns is cast onto the optical sensing array 2. The light source 1 may be a surface mounted light emitting diode (LED) or any other type of light-emitting device. The surface of mirror 5a may be curved in a manner that focuses light coming from the light source 1 onto the mirror 5b. The surface of mirror 5b, in turn, may be curved in a manner that collimates light coming from the mirror 5a as it travels to the patterns in the disks 3 and 4. A single mirror, more than two mirrors, and/or other types of optics may instead be used to perform both the focusing and collimation functions.

The light source 1 and the optical sensing array 2 may both be mounted on the single printed circuit board 6. This may provide a stable, rigid, accurate, and low cost mounting for these components. By focusing the light, lower emitted light power may be used without diminishing the light intensity incident on the optical sensing array 2. Reduced power consumption, decreased heat generation, and increased LED life may result. The collimating surface of the mirror 5b may reduce projected pattern variation resulting from distance variation between the sensing surface and the patterned disc surface. The design may be implemented without the mirrors 5a or 5b; however, this may require a different mounting arrangement for the light source 1.

The disks 3 and 4 may include integral ball bearing races 12a and 12b, respectively. The patterned disks 3 and 4 may be produced by stamping sheet metal. The integral ball bearing races 12a and 12b may be formed as part of this stamping process. Two additional separate ball bearing races 13 may also be provided.

Three sets of ball bearings 11 may run in the bearing races 12a, 12b, and 13 and may regulate the rotation and movement of both disks. Each set of ball bearings may have about ten balls that may be kept separated from one another by ball spacers 14. The formed bearing races 12a, 12b, and 13 may have a central axis coaxial with the central axis of the disk pattern within the limits of the tool fabrication. Balls rolling along these races may reduce wear and friction.

The sensor may include a compliant member 18 that may load the races against the balls to minimize any radial or axial motion of the disks with respect to a lid 34 and a housing 35.

The first disk may be connected to a compliant coupling 15 and the second disk may be connected to a compliant coupling 16. The compliant couplings may be configured to couple the sensor to a first and second rotatable shaft, respectively. The compliant couplings may prevent misalignment and run-out on the first and second shafts from imposing run-out on the first and second disks. These coupling features may allow the sensor to tolerate significant shaft run out without degrading accuracy.

Figure 6:
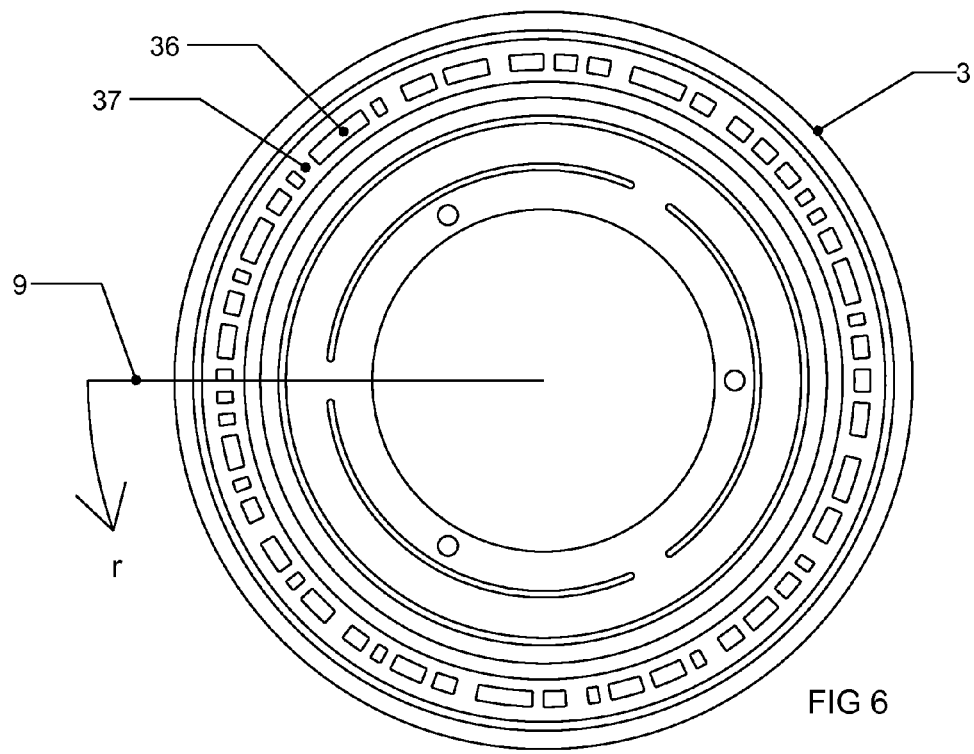
FIG. 6 illustrates a first patterned disk from a direction through which light may enter.
Figure 7:
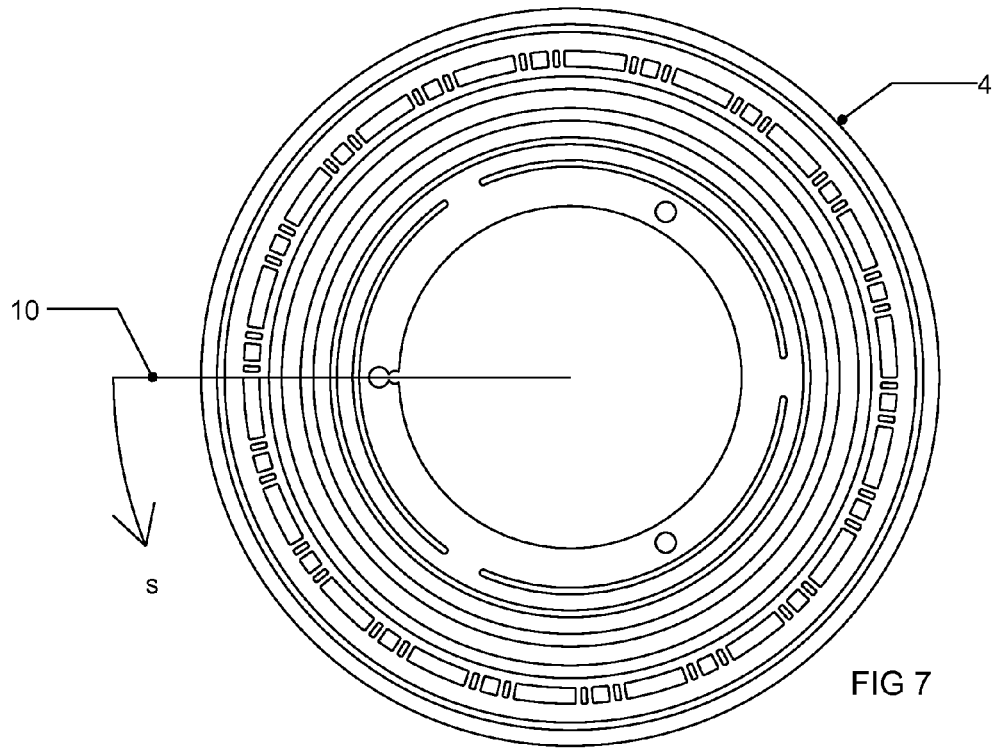
FIG. 7 illustrates a second patterned disk from a direction through which light may enter.

The patterns 7 and 8 may consist of transparent segments 36 and opaque segments 37 as shown in FIGS. 6 and 7. The light source 1 and the optical sensing array 2 may be arranged such that light may pass through the transparent segments of the second disk 4, impinge upon the first disc 3, pass through the transparent segments of the first disk 3, and impinge upon the optical sensing array 2. Hence, a pattern of illuminated and darker areas may be formed on the optical sensing array 2. The resulting pattern may be considered binary by assigning a '1' to illuminated areas, and a '0' to the darker areas.

Overview of Sensor Operation

Figure 12:
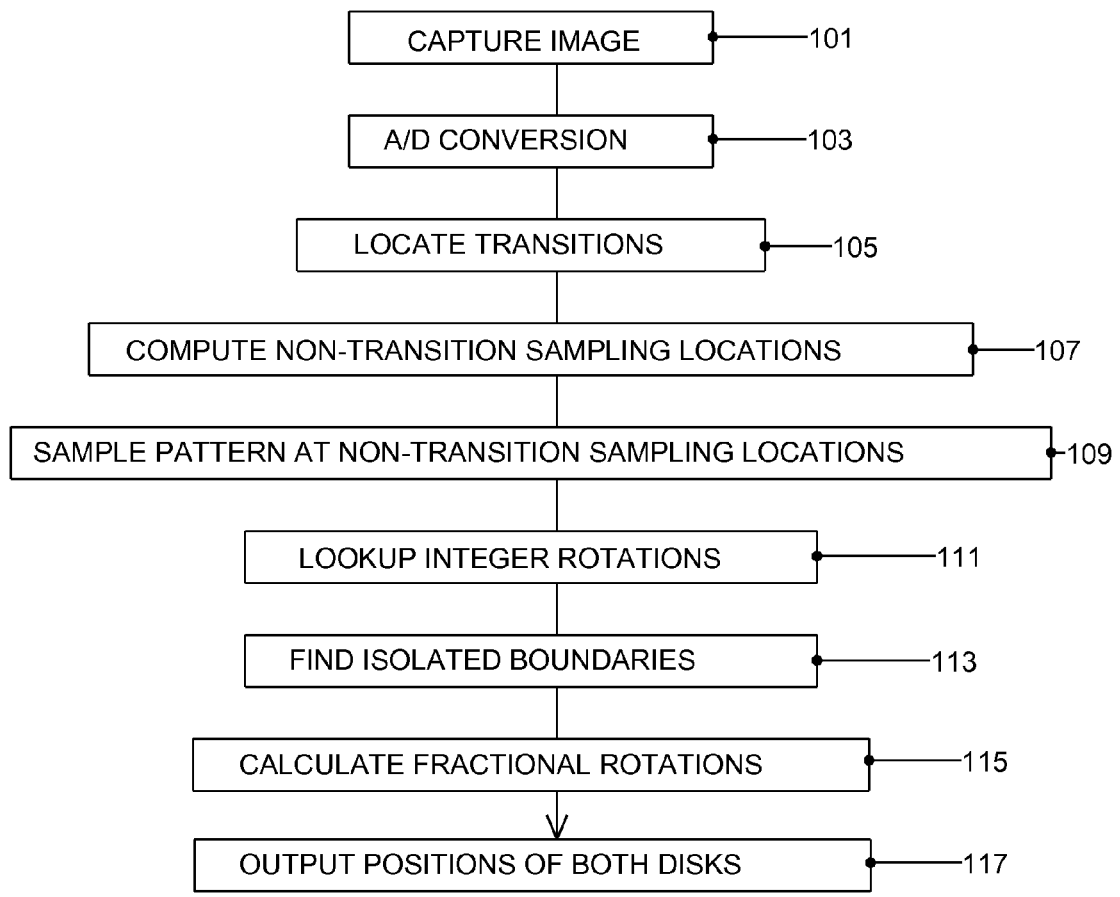
FIG. 12 is a flow diagram of a process that may be implemented by a rotation and differential angle optical sensor.

FIG. 12 is a flow diagram of a process that may be implemented by a rotation and differential angle optical sensor. An overview of this process will now be provided. Details about one or more approaches for implement each step follow.

The sensor may capture the consolidate pattern image which is cast upon the optical sensing array 2, as reflected by Capture Image step 101. The analog signal from each pixel of the optical sensing array 2 may be sensed and stored.

The sensor may then digitize each of the captured analog signals, as reflected by an A/D Conversion step 103.

The location of each transition in the captured pattern may be determined, as reflected by a Locate Transition step 105. Calibration data may be used to make these determinations, as described in more detail below. The resulting set of transitions is referred to below as the function G(x).

Locations may next be determined at which the captured pattern is to be sampled, as reflected by a Compute Non-Transition Sampling Locations step 107. Each sampling location may be at a location in the pattern at which there is no transition. This may eliminate an error that might otherwise be caused by imprecision in the transition.

The captured pattern may then be sampled at each sampling location, as reflected by a Sample Pattern at Non-Transition Sampling Locations step 109. A vector which may have M bits may be defined by the values in this sample where there may be one bit for each sample value.

The angular position of the first disk relative to a frame of reference and the angular position of the second disk relative to the first disk, both to the nearest segment, may then be determined using a look-up table (or other means), as reflected by a Lookup Integer Rotations step 111.

Greater precision in the measurements may then be obtained by determining the precise position of a transition edge on each disk with respect to a pixel element in the optical sensing array, as reflected by a Find Isolated Boundaries step 113. An "isolated" boundary is a boundary that lies on one of the disks at the detected position, but not the other.

The amount by which the position of each disk may vary from the positions of the nearest segment that were previously determined in step 111 may be calculated based on the located isolated boundary, as reflected by a Calculate Fractional Rotations step 115. Calibration data may again be used during this calculation.

The precise positions of each disk may then be outputted, as reflected by an Output Positions of Both Disks step 117.

The computations and lookups which have been described may be repeated periodically and/or on command to determine changes in the position of one or both of the rotatable members to which the sensor may be coupled.

The conversions, computations, and lookups which have been described may be performed by a signal processing system. The signal processing system may include an analog-to-digital converter, a data processing system, and a memory storage system. The data processing system may include computer hardware and software configured to perform the steps and functions which have been described herein. The computer software may include one or more algorithms configured to perform these steps and functions.

Disk Patterns

A pattern boundary may exist at every position along the pattern track where the pattern transparency changes from opaque to transparent. A chosen pattern boundary on each disk may be assigned as the 0 degree positions 9 and 10. The direction of angular measurement may be assigned by viewing the disks from the side that light enters. Angular position r on the first disk may be defined as the counter-clockwise (CCW) angle in degrees from the 0 degree position 9. Angular position s on the second disk may be defined as the CCW angle in degrees from the 0 degrees position 10.

Disks fabricated according to the invention may be partitioned into N nominally equal segments, and the transparency level may be constant over each segment. Hence, the pattern for each disk may be given by a value of 0 or 1 for each segment $i*360/N \leq r,s < (i+1)*360/N$ degrees where i is an integer and $0 \leq i < N$. If $F1(u)$ and $F2(u)$ give the transparency levels at angle u segments for the first and second disk respectively, the disk patterns may be given by $F1(i+0.5)$ and $F2(i+0.5)$ for $i=\{0, 1, 2, \ldots (N-1)\}$.

For the specific embodiment shown in FIG. 5 and FIG. 6, N may equal 360. $F1(i+0.5)$ may be given by:
{0, 0, 1, 1, 0, 0, 1, 1, 0, 0, 1, 1, 1, 1, 1, 0, 0, 1, 1, 0, 0, 1,
1, 1, 1, 0, 0, 0, 0, 1, 1, 1, 1, 1, 1, 0, 0, 1, 1, 0, 0, 1, 1, 1, 1,
1, 1, 0, 0, 0, 0, 1, 1, 1, 1, 0, 0, 1, 1, 0, 0, 1, 1, 1, 1, 1, 1, 0,
0, 1, 1, 1, 1, 0, 0, 0, 0, 1, 1, 1, 1, 1, 1, 1, 1, 1, 1, 0, 0, 1, 1,
1, 1, 0, 0, 0, 0, 1, 1, 0, 0, 1, 1, 1, 1, 1, 1, 0, 0, 1, 1, 1, 1, 1,
1, 0, 0, 1, 1, 0, 0, 0, 0, 1, 1, 1, 1, 0, 0, 1, 1, 1, 1, 1, 1, 0, 0,
1, 1, 1, 1, 0, 0, 1, 1, 0, 0, 0, 0, 1, 1, 1, 1, 1, 1, 0, 0, 1, 1, 1,
1, 1, 1, 1, 0, 0, 0, 0, 1, 1, 1, 1, 1, 1, 0, 0, 1, 1, 1, 1, 0, 0,
1, 1, 1, 1, 0, 0, 1, 1, 0, 0, 1, 1, 1, 1, 1, 1, 1, 0, 0, 1, 1, 1,
1, 0, 0, 1, 1, 0, 0, 1, 1, 1, 1, 1, 1, 1, 0, 0, 1, 1, 1, 1, 0, 0,
1, 1, 1, 1, 0, 0, 0, 0, 1, 1, 1, 1, 1, 1, 1, 1, 1, 1, 1, 1, 1, 1,
1, 0, 0, 0, 0, 1, 1, 1, 1, 0, 0, 1, 1, 1, 1, 1, 1, 1, 1, 1, 1, 1,
0, 0, 0, 0, 1, 1, 1, 1, 1, 1, 1, 1, 0, 0, 1, 1, 1, 1, 1, 1, 0, 0, 0,
0, 1, 1, 0, 0, 1, 1, 1, 1, 1, 1, 1, 1, 1, 0, 0, 0, 0, 1, 1,
0, 0, 1, 1, 1, 1, 0, 0, 1, 1, 1, 1, 1, 1, 1, 1, 0, 0, 1, 1, 0, 0, 1,
1, 1, 1, 0, 0, 1, 1, 1, 1, 1, 1, 0, 0, 1, 1}.

$F2(i+0.5)$ may be given by: {1, 1, 1, 1, 1, 1, 1, 1, 1, 1, 0, 1, 0, 1, 1, 1, 0, 1, 0} (this 20 bit pattern may repeat 17 more times).

Projected Pattern with Disks at Zero Position

At least M segments of each disk may be projected onto the optical sensing array 2. M may be a positive integer.

Figure 2B:
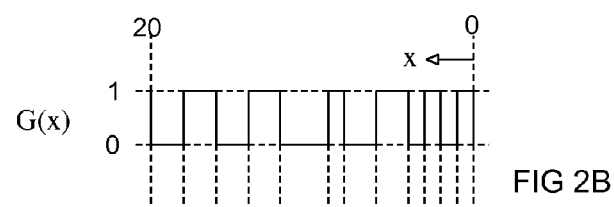
FIG. 2B illustrates a binary pattern that is indicative of transitions in the portion of the consolidated pattern of the two disks illustrated in FIG. 2A.
Figure 2A:
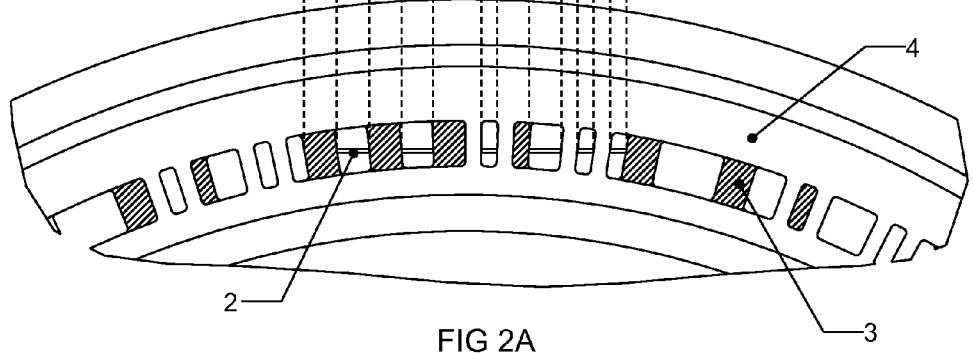
FIG. 2A illustrates a consolidated portion of the annular patterns of two of the disks which are illustrated in FIG. 1 and an underlying optical sensing array.

FIG. 2A shows an example of the disk patterns positioned over the optical sensing array and FIG. 2B shows the binary output of the optical sensing array 2 after signal processing. The 0 degree rotation of the first disk may be given by the rotation where the 0 degree position 9 projects directly over the CW end of the optical sensing array 2. The zero degree rotation of the second disk may be given by rotation where the 0 degree position 10 projects directly over the CW end of the optical sensing array.

Figure 8:
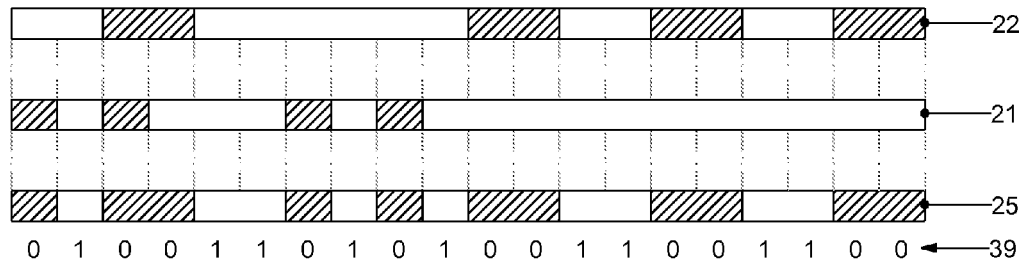
FIG. 8 illustrates a projected pattern of the first 20 segments of the first disk illustrated in FIG. 6 when at a position designated as zero, a projected pattern of the first 20 segments of the second disk illustrated in FIG. 7 when at the zero position, the consolidated projection of both disks, and binary values of the consolidated projection.

The M bit pattern on the optical sensing array may be given by (F1(0.5) AND F2(0.5), F1(1.5) AND F2(1.5), . . . F1(M−0.5) AND F2(M−0.5)). This may be shown schematically in FIG. 8; diagram 22 shows the projected pattern of the first disk 3 at the zero position, diagram 21 shows the projected pattern of the second disk 4 at the zero position, diagram 25 shows the consolidated projected pattern of both disks, and diagram 39 is the 20 bit binary vector of diagram 25. If the first disk has been rotated CW by i segments and the second disk has been rotated by j segments, then the projected pattern may form an M bit dimensional vector on the optical sensing array and may be given by (F1(i+0.5) AND F2(j+0.5), F1(i+1.5) AND F2(j+1.5), F1(i+M−1+0.5) AND F2(j+M−1+0.5)).

Figure 10:
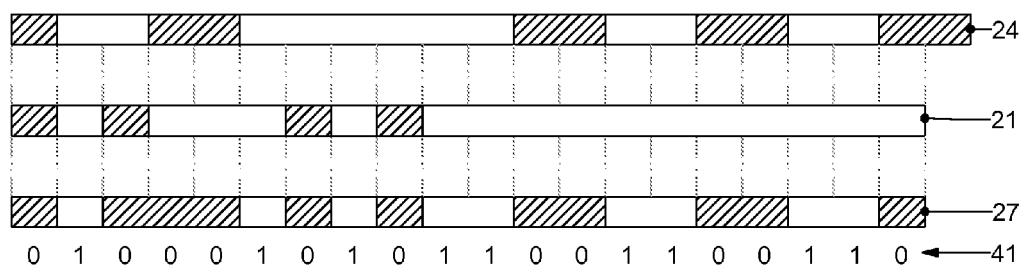
FIG. 10 illustrates the first 21 segments of the projected pattern of the first disk illustrated in FIG. 6 shifted 1 segment CW, the projected pattern of the first 20 segments of the second disk illustrated in FIG. 7 when at the zero position, and the binary values of the consolidated projection of both disks.

FIG. 10 is a schematic representation of the projected pattern with the first disk rotated CW one segment (i=1) and the second disk at the zero position (j=0). In FIG. 10; diagram 24 shows the projected pattern of the first disk 3 rotated 1 segment CW from the zero position, diagram 21 shows the projected pattern of the second disk 4 at the zero position, diagram 27 shows the consolidated projected pattern of both disks, and diagram 41 is the 20 bit binary vector of diagram 27.

Determining Integer Rotations

The angular position of each disk may be determined to integer multiples of a segment in the following way. Let x be the position measured in segments along the optical sensing array starting at the CW end of the array as shown in FIG. 2B. Let G(0) be equal to the illumination value on the optical sensing array at x=0 resulting from the projection of F1(i) AND F2(j), where i is the position of the first disk over the CW (starting end) of the optical sensing array and where j is the position of the second disk over the CW (starting end) of the optical sensing array. Let G(x) be equal to the illumination value on the optical sensing array resulting from the projection of F1(i+x) AND F2(j+x). Then the M bit dimensional vector on the optical sensing array may be given by (G(0.5), G(1.5), . . . G(M−0.5)).

If $0 \leq i < N$, and $i \leq j < i+K$, then there are N*K unique binary patterns corresponding to the N segment rotations of the first disk with the K segment rotations of the second disk. K may be an integer, which may be $\geq M$. K may be called the maximum differential sensing angle and may be determined by the pattern construction.

One method of relating the binary vectors of length M to the i and j disk rotations may be by constructing a lookup table. The (K*i+j)th entry in the table may be made the M bit dimensional vector corresponding to the i segment rotation of the first disk with the (i+j) segment rotation of the second disk. In the specific embodiment, M equals 20. Other values may be used instead.

Selecting Appropriate Value of $x_i$ and $x_j$

Figure 9:
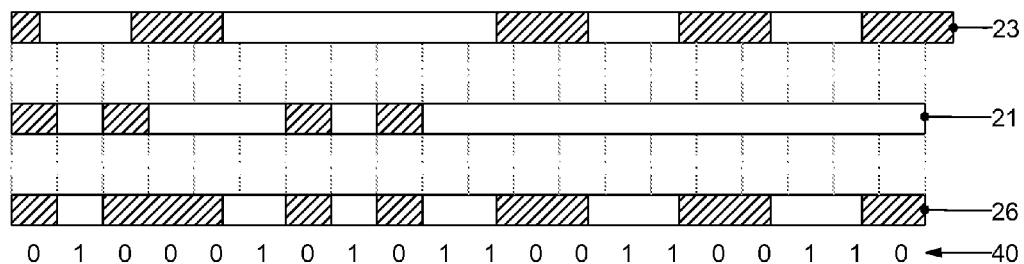
FIG. 9 illustrates the first 20.625 segments of the projected pattern of the first disk illustrated in FIG. 6 shifted 0.625 segments clockwise (CW), the projected pattern of the first 20 segments of the second disk illustrated in FIG. 7 when at the zero position, the 20 segments of the consolidated projection of both disks, and the binary values of the consolidated projection of both disks.

The disks are not restricted to rotating to angular positions that are an integer number of segments. For example, FIG. 9 shows the first disk rotated 0.625 segments CW from the zero position and the second disk in the zero position. In this case, the M bit binary vector may be constructed from illumination levels that are not located in the middle of each segment, because the illumination level in the middle of a segment may be very close to a transition which may lead to an incorrect value.

Let $x_i$ and $x_j$ be rotations of the first and second disks, respectively, that are fractions of a segment. In this case, the angular position of each disk may be expressed as the sum of the integer rotation and the fractional rotation; $i+x_i$ for the first disk and $j+x_j$ for the second disk. To construct the binary vectors of M bits, illumination levels on the optical sensing array may be sampled at specific locations away from boundary transitions. These sampling locations may depend on $x_i$ and $x_j$. Due to manufacturing imperfections, the pattern boundaries may not be spaced by exact integer multiples of segments. Hence, $x_i$ and $x_j$ may vary from boundary to boundary.

An algorithm for selecting an appropriate value of $x_i$ and $x_j$ may be used. For this method, the variation of $x_i$ and $x_j$ are each contained in an envelope of at most 0.25 segments. To make the selections, map the fractional part f, a member of [0,1), to the unit circle. The unit circle, c(f), is mapped by c(f)=360*f degrees. Angles may be designated to increase from zero in the CCW direction. Then, all $c(\{x_i\})$ lie in an arc of at most 90 degrees, and all $c(\{x_j\})$ lie in an arc of at most 90 degrees. It follows that there exists an arc, A, that contains no $x_i$ or $x_j$, of at least 90 degrees.

Let $A_1$ be the CW end of A, and $A_2$ be the CCW end of A, where A is the arc starting at $A_1$ and continuing CCW to $A_2$. Take $c^{-1}(A_2+45)$ for $x_i$ and $c^{-1}(A_1-45)$ for $x_j$. At this point, it may not matter if $x_i$ is the fractional rotation of the first or second disk.

Sampling Location for Fractional Rotations

The values for $x_i$ and $x_j$ described above may be used to construct the M bit dimensional vector. Consider the case where one disk has been rotated CW $i+x_i$ segments and the other disk has been rotated CW by $j+x_j$ segments with $0 \leq x_i$, $x_j < 1$. In this case, the M bit dimensional vector is as follows:
if $x_i \leq 0.25$, and $(x_i \leq x_j < x_i+0.5$ or $x_j+0.5 \leq x_i < x_j+1)$ use
   $(G(0.25-x_i), G(1.25-x_i), \ldots G(M-0.75-x_i))$;
if $x_i \leq 0.25$ and $(x_i+0.5 \leq x_j < x_i+1$ or $x_j < x_i < x_j+0.5)$ use
   $(G(0.75-x_i), G(1.75-x_i), \ldots G(M-0.25-x_i))$;
if $x_i > 0.25$ and $(x_i \leq x_j < x_i+0.5$ or $x_j+0.5 \leq x_i < x_j+1)$ use
   $(G(1.25-x_i), G(2.25-x_i), \ldots G(M+0.25-x_i))$;
if $0.25 < x_i \leq 0.75$ and $(x_i+0.5 \leq x_j < x_i+1$ or $x_j < x_i < x_j+0.5)$ use
   $(G(0.75-x_i), G(1.75-x_i), \ldots G(M-0.25-x_i))$;
if $0.75 < x_i < 1$ and $(x_i+0.5 \leq x_j < x_i+1$ or $x_j < x_i < x_j+0.5)$ use
   $(G(1.75-x_i), G(2.75-x_i), \ldots G(M+0.75-x_i))$.

This M bit binary vector may now be used to determine the integer segment rotations by using a lookup table. An example of the construction of this vector is shown schematically in FIG. 9; diagram 23 shows the projected pattern of the first disk 3 rotated 0.625 segment CW from the zero position, diagram 21 shows the projected pattern of the second disk 4 at the zero position, diagram 26 shows the consolidated projected pattern of both disks, and diagram 40 is the 20 bit binary vector of diagram 26 constructed by using the method given above. Approaches other than a lookup table may be used in addition or instead, such as by performing algorithmic calculations.

Defining Isolated Boundaries

A segment may be a sector of any angle, such as one degree. The size of a segment may depend on the value chosen for N. An application may require rotations to be resolved within a small fraction of a segment. To describe how fractional disk rotations may be resolved, the term "isolated boundary" is defined as follows. Let $P=(p_0, p_1, \ldots p_{(M-1)})$ be the M bit dimensional vector which would be projected onto the optical sensing array as a result of only the first disk rotated an integer number of segments. Let $T=(t_0, t_1, \ldots t_{(M-1)})$ be the M bit dimensional vector which would be projected onto the optical sensing array as a result of only the second disk being rotated an allowed integer number of segments. If $t_i$ and $t_{(i+1)}$ have different values and $p_i$ and $p_{(i+1)}$ are both 1, the second disk may be said to have an isolated boundary at i+1. If $p_i$ and $p_{(i+1)}$ have different values and $t_i$ and $t_{(i+1)}$ are both 1, the first disk may be said to have an isolated boundary at i+1.

Locating Isolated Boundaries

Perform a right shift of T and P so that $T_1=(t_1, t_2, \ldots t_{(M-1)}, 0)$ and $P_1=(p_1, p_2, \ldots p_{(M-1)}, 0)$. Define the compliment operator, ~, on an M dimensional binary vector by $(\sim T)=(\sim t_0, \sim t_1, \ldots \sim t_{(M-1)})$. Define the bitwise product of vectors as $PT=(p_0*t_0, p_1*t_1, \ldots p_{(M-1)}*t_{(M-1)})$. In algebraic notation, an isolated second disk boundary exists at i+1 segments from zero whenever $PP_1(\sim T)T_1$ or $PP_1T(\sim T_1)$ is 1 at bit i. An isolated first disk boundary exists at i+1 segments from zero whenever $TT_1(\sim P)P_1$ or $TT_1P(\sim P_1)$ is 1 at bit i. The case i=19 may be excluded, since bit 20 may be of unknown value. The patterns may be designed so that for every allowed integer segment rotation of the disks, at least one first disk isolated boundary and one second disk isolated boundary exists.

Figure 11:
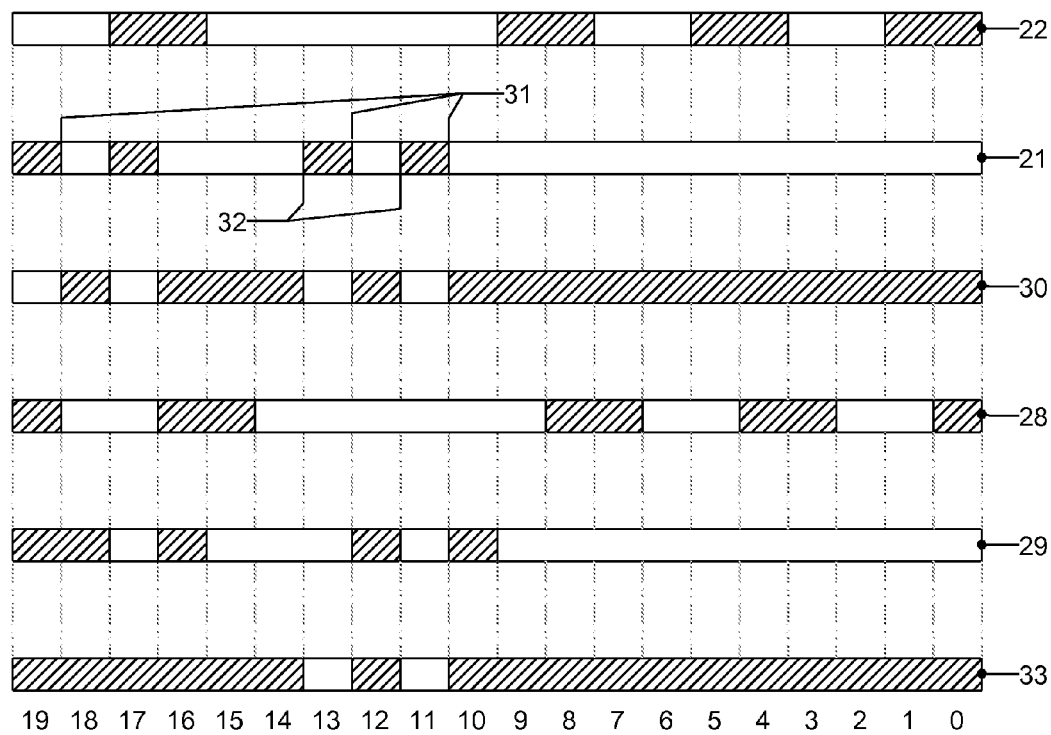
FIG. 11 illustrates six 20 bit binary vectors. The first vector is a projected pattern of the first disk illustrated in FIG. 6 when at the zero position, the second vector is a projected pattern of the second disk illustrated in FIG. 7 when at the zero position, the third vector is the compliment of second vector, the fourth vector is the logical right shift of the first vector, the fifth vector is the logical right shift of second vector, and the sixth vector is the bitwise product of the first, third, fourth and fifth illustrated vectors.

FIG. 11 illustrates information that may be used in a determination of isolated boundaries. Diagram 22 represents the 20 bit binary vector P for the first disk at position zero degrees. Diagram 21 is the 20 bit vector T for the second disk at zero degrees. Diagram 30 is the compliment (~T) of diagram 21. Diagram 28 is $P_1$ for P as shown in diagram 22. Diagram 29 is $T_1$ for T as shown in diagram 21. Diagram 33 is $(\sim T)T_1PP_1$ and has value 1 for bits 11 and 13 indicating that diagram 21 has isolated boundaries at 12 and 14 segments from zero. Diagrams 31 and 32 indicate all the isolated second disk boundaries when the first and second disks are at the zero position.

Determining Fractional Rotations

When a first disk isolated boundary has been identified, the fractional rotation of the first disk may be given by the actual position of the isolated boundary minus the integer position of the boundary in segments. The fractional rotation of the second disk may be computed similarly. One method that may be used to identify the actual position of a boundary is detailed in the paragraphs below describing calibration.

Calibration of Optical Sensing Array

Calibration may allow the sensor to correct for anomalies in the geometry and location of the optical sensing array and the patterned disks.

The optical sensing array may be calibrated first. Calibration of the 128 pixel optical sensing array consists of measuring and storing 3 parameters for each pixel in the array. These are: pixel midspan value $q_i$, pixel midpoint location $v_i$, and pixel slope $m_i$. These values may be stored in three 128 element arrays in a data storage system within the sensor. These parameters may then use for linear interpolation to calculate the location of transitions. The light sensitive elements comprising the optical sensing array may include areas of known boundary that produce an electrical response ranging from a minimum value to maximum value as the light power incident on their surface varies from a minimum to a maximum. Several of said light sensitive elements may be employed in the sensor and their relative angular locations in the sensor may be calibrated to improve the accuracy of the sensor.

In one embodiment, the optical sensing array may consist of 128 elements (pixels). The element locations may be calibrated next. The first light sensor element may be chosen as the zero degree element. The patterned disks may be rotated CCW in unison, so that an opaque area, followed by a transparent area passes over the zero degree element. The disks may be oriented so that the opaque and transparent areas have greater projected width than the element area. As a result, the zero element response may change from a minimum to a maximum. The instrument rotating the discs may be equipped with a high accuracy, high resolution rotational measurement device. The rotation at which the zero element response equals (maximum−minimum)/2 may be noted. The rotation may be continued over all the remaining light sensing elements with the rotation angle at which each element achieves its mid-span response being recorded in a data storage system within the sensor. These relative locations of the sensing elements from the zero element may be termed the midpoint. All midpoint locations, $v_i$ and midpoint values $q_i$ for each element i, may be recorded in the data storage system in the sensor. For the embodiment described in this specification, the rotating instrument may have an accuracy better than 0.0025 degrees and a resolution of at least 0.001 degrees.

As noted above, the response of each light sensitive element may vary from a minimum value to a maximum value as the projected pattern on the element varies from entirely dark to entirely illuminated. This response change may occur over an angular displacement approximately equal to the arc length spanned by the element under consideration. Deviations from this theoretical length may occur for a variety of reasons, including imperfect parallelism in the light, imperfect parallelism of the disks with sensing element surfaces, and imperfect alignment of the disk pattern boundaries with sensing element boundaries.

For this reason, a pixel slope calibration may also be recorded in the data storage system for each sensing element used in the sensor. Define $m_i=W/(Rmax-Rmin)$. $m_i$ has the units of degrees per element response. Here W is chosen to be the arc subtended by the average optical sensor element, Rmax is the element response when the boundary that transitions from transparent to opaque has been rotated W/2 degrees past the element midpoint, Rmin is the element response when the boundary that transitions from transparent to opaque lies W/2 degrees before the element midpoint and we have indexed the elements by index i. The useful resolution of a sensor so constructed may be (element noise)($m_i$) degrees. Nonlinearity of the element response, calibration errors, and mechanical noise may further limit the useful sensor resolution.

Disk Calibration

The patterns on each disk may not be perfectly positioned. Calibration of the disks may consist of measuring and storing the error in the edge location of each edge (boundary) on each disk. These values may be stored in two arrays (one for each disk). The array sizes may be based on the pattern chosen. The following method may be used to compensate for these inaccuracies.

A boundary may be either a falling boundary or a rising boundary. A falling boundary may occur at position $v_i + m_i * (pix_i - q_i)$, degrees where $pix_i$ is the element response of element i, which may be less than $q_i$, and the response $pix_{(i-1)}$ may be greater than $q_{(i-1)}$. A rising boundary may be analogous. Disk calibration may allow typical fabrication tolerances without degrading accuracy. Adding calibration data to the data storage system may increase the accuracy of the sensor.

The edge positions may be calibrated by recording the difference, actual position minus nominal position, as an offset for each pattern boundary in the first and second disks. The reported rotation angle may be modified by adding the calibration offset to the rotation angle computed from edges assumed to be located at nominal position. The offset used may be the offset corresponding to the isolated pattern boundary used to compute the fractional component of the rotation as described in a previous paragraph. For a disk of perfect form, all offsets may be zero degrees. Both disks may be calibrated by rotating them using an instrument of high angular precision and high resolution. A particular sensing element may be selected and the angle at which the first pattern boundary is incident with this element midpoint may be recorded in the data storage system. The angular rotation at which each successive boundary becomes incident with the selected element midpoint may also be recorded in the data storage system. If the pattern construction has perfect form, all the recorded positions differ by an integer multiple of 360/N. Typically, the position of each boundary may occur at a nominal rotation +ϵ where ϵ is the error term for the boundary position. An ϵ term may be recorded for each boundary in the data storage system.

These ϵ terms may be used to improve the accuracy of the sensor when reporting rotation. Let h be an integer [0,359]. A boundary at a nominal location of 360 h/N degrees CCW of the zero element midpoint may nominally be rotated 360 h/N degrees CW to be located at the zero element midpoint. The actual rotation required to bring the boundary in alignment with the zero element midpoint may be (360 h/N+ϵ) degrees CW. Each disk may be calibrated in a similar manner.

Simple Pattern

A pattern may have N=360 and M=20. The selected processor may not be able to perform a 7200 entry lookup within the required response time. For this reason, the patterns may be designed to be separable into first and second disk patterns. The first disk pattern may splice 18 ten bit patterns with their 10 rotations to produce 180 unique 10 bit patterns. Each bit may be two degrees wide to complete the 360 degree pattern.

The second disk pattern may be defined by the ten bit pattern equivalent of the hexadecimal value 0x9f for the even bits with ones inserted for the odd bits, producing a 20 bit pattern. This 20 bit pattern may be repeated 18 times to complete the 360 degree pattern. By interleaving 1's in the second disk pattern, one of the 180 distinct first disk patterns is always projected. A 10 bit first word may be constructed from the even bits and a 10 bit second word from the odd bits. The word with the most number of ones may be the first disk pattern and can be found in a 180 pattern table. The first disk rotation may be an even number of segments if the second disk word equals (first disk pattern) AND (a rotation of 0x9f). Otherwise, the first disk rotation may be odd. For even second disk rotations, the first disk word may be the word derived from the odd bits. The relative rotation of the second disk may be calculated since the second disk pattern cycles through each of its 10 rotations in 20 segments.

The algorithm for determining the position of both disks described above may be based on the specific pattern and hardware chosen; other algorithms may be devised, depending on pattern selection and the hardware chosen to compute the positions.

Disk patterns may be designed by first considering the sensor requirements. One disk may be configured to resolve any rotation over a full revolution and a second disk may be configured to resolve a maximum differential sensing angle. In the embodiment described, a 20 degree differential rotation may be determined.

Mounting requirements may be a consideration. In one embodiment, a shaft of a diameter up to 24.6 mm may pass through the center of the disks. This may limit the minimum diameter of the disks. Selection of the optical sensing array may constrain the design. The sensor housing may be large enough to house the optical sensing array. The optical sensing element(s) in the optical sensing array may limit the spatial resolution. Let e be the nominal spacing of the elements in the array. The pattern radius b may be large enough so that the angular resolution (arctan(e/b)) is satisfactory for the application. Economic considerations may constrain the mechanical position variation, for a fixed rotation, to a value of z. The pattern radius b may be large enough to insure that the angular variation resulting from this mechanical variation, arctan(z/b) degrees, does not exceed the allowable sensor output variation. After consideration, a minimum pattern radius and an optical sensing array may be chosen.

With the optical sensing array and pattern radius determined, the arc span of the sensing elements, $\alpha$ rotations, may be computed. In one embodiment, $\alpha \ll 1$. If N is the number of pattern segments in a full rotation, $\alpha N$ may be the number of segments visible in the projected image. For a binary pattern, $2^{(\alpha N)}$ binary patterns or less may be projected onto the sensing element(s). The choice of N may also determine the minimum number of distinct projected patterns required. There may be N integer rotations by a segment corresponding to a full rotation of the first disk and, for each of those N segment rotations, there may be $\beta N$ segment rotations corresponding to the allowable sensed differential rotation of the second disk. To uniquely determine each of the rotations, at least $\beta NN$ distinct projected patterns may be used. Neglecting the complication of rounding to integers, the relation $2^{(\alpha N)} \geq \beta NN$ may be implied. This may be a strict limit on the minimum size of N and may not be obtained because $2^{(\alpha N)}$ may over estimate the actual number of patterns that may be designed into the disk.

Define the term 'weight' of a pattern to equal the number of ones in a projected pattern. Let q be the minimum weight of all the binary patterns projected by the first disk. There may be at least $\beta N$ combined projected patterns for any fixed first disk pattern. Hence, $2^q \geq \beta N$, where 2 may equal the maximum possible distinct combined patterns for the first disk pattern with weight q. This may eliminate all patterns of lower weight from the $2^{(\alpha N)}$ estimate. A better estimate for N may be given by $2*C(M,M/2) \geq \beta NN$ (where C is the combination function) where M may be chosen so that $M \leq \alpha N$. M is the number of bits in the projected pattern. All binary patterns considered for this invention may have projected patterns for the first disk of a least two weights. A disk which projects only one weight of patterns may not have N larger than M.

The first and the second annular patterns may be configured such that the angular displacement of the second rotatable member relative to the first rotatable member angle may be accurately indicated by the output of the sensor up to a maximum displacement sensing angle, regardless of how the first annular pattern is aligned with respect to the second annular pattern at the time the couplings are coupled to their respective rotatable members. The annular patterns illustrates in FIGS. 6 and 7 are an example of such annular patterns.

The annular pattern in one of the disks may include or consist of repetitions of a sub-pattern. The sub-pattern may have multiple transitions between the different levels of optical transparency. The sub-pattern may span an angle that is substantially equal to the maximum displacement sensing angle. The annular patterns illustrates in FIGS. 6 and 7 are an example of such annular patterns.

The preceding discussion pertains to a sensor for detecting angular rotations. The same principles may apply equally to a sensor for detecting linear displacements. The disks could be replaced with translating members and the annular patterns could be laid out in a straight line.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "maximum displacement angle" refers to the differential angle that can be sensed between two rotatable members and is the sum of the number of degrees by which one rotatable member may be rotated relative to the other rotatable member in both the positive and negative directions.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. A sensor for simultaneously sensing the angular position of a first rotatable member relative to a frame of reference and the angular position of a second rotatable member relative to the first rotatable member, the sensor comprising:
a first disk having a first annular pattern which alternates between two different levels of optical transparency;
a first coupling configured to couple the first disk to the first rotatable member;
a second disk having a second annular pattern which alternates between two different levels of optical transparency and which has substantially the same radius as the first annular pattern, the first and second disk being configured such that the first and the second annular patterns may independently rotate about substantially the same axis while remaining substantially adjacent to one another;
a second coupling configured to couple the second disk to the second rotatable member;
an optical sensing array configured to provide signals indicative of an illumination pattern which is cast upon the optical sensing array;
a lighting system configured to direct light toward the first and the second disks with an orientation that causes an illumination pattern to be cast upon the optical sensing array which corresponds to a composite of a portion of the first and the second annular patterns; and
a signal processing system configured to:
determine locations of transitions between different levels of illumination in the illumination pattern that is cast upon the optical sensing array;
determine locations at which to sample the illumination level in the illumination pattern that is cast upon the optical sensing array that are not at a transition;
sample the illumination level in the illumination pattern that is cast upon the optical sensing array at each of the sampling locations; and
generate an output that is indicative of both of the angular positions based on the illumination pattern sample.

2. The sensor of claim 1 further comprising a data storage system containing a look-up table that contains a plurality of unique reference illumination patterns and, for each, a corresponding unique set of both of the angular positions, and wherein the signal processing system is configured to determine both of the angular positions by finding a match in the look-up table between the illumination pattern sample and one of the reference illumination patterns in the look-up table.

3. The sensor of claim 2 wherein the reference illumination patterns and the illumination pattern sample are each binary vectors.

4. The sensor of claim 3 wherein all of binary vectors have the same length and wherein the length is in excess of ten bits.

5. The sensor of claim 4 wherein the length is at least twenty bits.

6. The sensor of claim 1 wherein the output is indicative of both of the angular positions to the nearest of one of a set of angular reference positions and wherein the signal processing system is configured to determine both of the angular positions more precisely based on the location of a transition in the illumination pattern sample which correspond to a transition in the first annular pattern and a transition in the illumination pattern sample which corresponds to a transition in the second annular pattern.

7. The sensor of claim 6 wherein the transitions are each at a location at which the annular pattern transitions in only one of the disks.

8. The sensor of claim 1 further comprising a data storage system containing calibration data, and wherein the signal processing system is configured to utilize the calibration data when determining the location of at least one of the transitions in the illumination pattern.

9. The sensor of claim 8 wherein:
the optical sensing array has a plurality of pixel elements, each of which provides a signal indicative of a level of illumination which is cast upon the pixel element; and
the calibration data includes data indicative of the level of the signal from each pixel element when a known portion of the pixel element is illuminated.

10. The sensor of claim 9 wherein the known portion is approximately half of the pixel element.

11. The sensor of claim 8 wherein:
the optical sensing array has a plurality of pixel elements; and
the calibration data includes data indicative of the location of each pixel element.

12. The sensor of claim 8 wherein:
the optical sensing array has a plurality of pixel elements, each of which provides a signal indicative of the level of illumination which is cast upon the pixel element; and
the calibration data includes data indicative of the rate at which the signal that is provided by each pixel element changes as a function of changes in the level of illumination which is cast upon each pixel element.

13. The sensor of claim 1 further comprising a data storage system containing calibration data that includes data indicative of a location error in each of the transitions between the two different levels of optical transparency in each of the annular patterns, and wherein the signal processing system is configured to utilize the calibration data when generating the output.

14. The sensor of claim 1 wherein the illumination pattern sample contains at least ten transitions.

15. The sensor of claim 1 wherein:
the sensor is for sensing the angular position of the second rotatable member relative to the first rotatable member up to a maximum displacement angle;
the optical sensing array has a length which is not substantially greater than the width of the illumination pattern cast upon the optical sensing array; and
the lighting system is configured to causes the illumination pattern which is cast upon the optical sensing array to be annular and to span an angle that is less than or equal to the maximum displacement angle.

16. The sensor of claim 1 wherein each of the disks are formed by a stamping process.

17. The sensor of claim 1 wherein each of the disks has an integral race configured to support ball bearings.

18. The sensor of claim 1 wherein the lighting system includes a light source and a reflecting system configured to focus and collimate light from the light source onto the first and the second disks.

19. The sensor of claim 18 wherein the light source and the optical sensor array are adjacent to the same side of one of the disks.

20. The sensor of claim 19 wherein the light source and the optical sensor are mounted to a common circuit board.

* * * * *